Nov. 19, 1963 W. W. CROWE ETAL 3,111,573
ELECTRIC HEATING AND AIR CIRCULATING UNIT
Filed Nov. 4, 1960

INVENTORS:
Wylie W. Crowe
Allen P. Livar
BY
Edw. ...
ATTORNEY

United States Patent Office 3,111,573
Patented Nov. 19, 1963

3,111,573
ELECTRIC HEATING AND AIR
CIRCULATING UNIT
Wylie W. Crowe, 1886 Windemere Drive NE., Atlanta, Ga., and Allen P. Livar, Atlanta, Ga.; said Livar assignor to Joseph J. Perry, Sr., Atlanta, Ga.
Filed Nov. 4, 1960, Ser. No. 67,257
8 Claims. (Cl. 219—39)

This invention relates to electric heating units and is more particularly concerned with an electric heating and air circulating unit for installation in the wall of a room of a building for heating and circulating air in the room.

In the past many and various devices have been made for heating and circulating air in a room; however, such devices have usually been relatively expensive to construct, and, in some instances have been unsightly when installed. Further, the prior art devices once installed are difficult to service and may tend to overheat. Certain of these devices require the heat to be transferred from the heating unit to baffles and plates and thence to the air stream.

To overcome these problems in the prior art, we have devised a relatively simple and inexpensive electrical heating and air circulating unit which, briefly described, includes a tubular member adapted to be retained in the wall of a building, the tubular member having a blower at its upper end for taking in air and moving the air downwardly in the tubular member, over removably mounted heating coils suspended by clips, and out through the bottom opening. A thermostat controls the actuation of the heating unit and the blower. The unit is so constructed that it may be mounted between adjacent studs, even though the distance between studs of various installations may vary.

Accordingly, it is an object of the present invention to provide an electrical heating and air circulating unit which is economical to manufacture, easy to assemble and install, durable in structure and efficient in operation.

Another object of the present invention is to provide in an electrical heating and air circulating unit a heating element which may readily and quickly be installed and removed from the unit without disturbing the finished wall or unit.

Another object of the present invention is to provide in an electrical heating and air circulating unit, an efficient and effective means of installing the unit in standard stud walls or concrete blocks or concrete walls.

Another object of the present invention is to provide an electrical heating and air circulating unit wherein air circulated through the unit will travel across the walls adjacent the unit and low velocities so as not to disturb dust accumulated on the walls and cause discoloration of the walls and yet travel across the heating coils at relatively high velocity so as to absorb heat from the relatively cool coils.

Another object of the present invention is to provide in an electrical heating and air circulating unit, a blower so mounted as to reduce to a minimum the vibrations therefrom and to create an efficient feed of air to the heating element of the unit.

Another object of the present invention is to provide an electrical heating and air circulating unit which is self-aligning with the studs of a wall.

Other objects, features and advantages of the present invention will become apparent from the following description when taken in conjunction with the accompanying drawings wherein like characters of reference designate corresponding parts throughout the several views and wherein.

Figure 1:
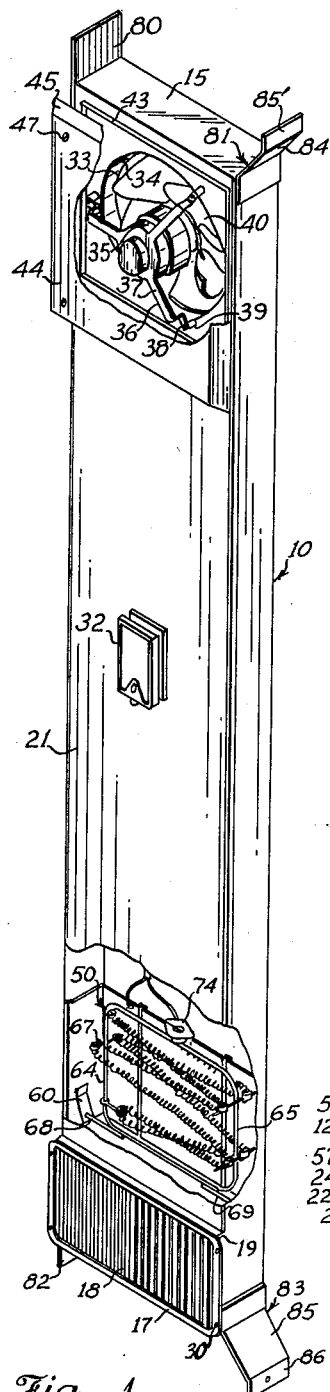
FIG. 1 is a partially broken perspective view of an electrical heating and air circulating unit constructed in accordance with the present invention.

Referring now in detail to the embodiment chosen for the purpose of illustrating the present invention, it being understood that in its broader aspects the present invention is not limited to the exact details depicted in the drawings, numeral 10 denotes a hollow rectangular tubular body formed of sheet metal. Preferably, the back panel 11 and side panels 12 and 13 of body 10 are formed integrally with each other, utilizing a brake to bend these elements into a U-shaped channel member open at the front and ends. The upper and lower ends of the tubular body 10 are provided with bottom 14 and top 15 formed by bending extensions of back panels 11 forwardly and joining the edges of side panels 12 and 13 to the edges of bottom 14 and top 15 by spot welded or soldered lap seams.

The outer or forward edge of bottom 14 is bent downwardly to provide a lower flange 16 which receives the lower portion of a flat rectangular frame 17 of a grill or grate which contains within the frame 17 vertically disposed grills or louvers 18 extending over the open lower front bottom portion of the body 10. The sides of frame 17 are supported by forwardly and outwardly bent side members 19 formed as an integral extension of the lower end portions of side panels 12 and 13.

Behind the louvers 18 and within the lower end of body 10 is an air baffle 20 which is a curved member permanently secured in place between the side panels 12 and 13 and curving downwardly and outwardly from an intermediate portion of back 11 to terminate at about the outer edge of bottom 14. The baffle 20 is a sheet metal member curved so as to be about tangential to the bottom 14 at its outer edge and also tangential to the back 11 at the inner end portion of baffle 20, the baffle terminating in about the horizontal plane or height of frame 17.

Figure 4:
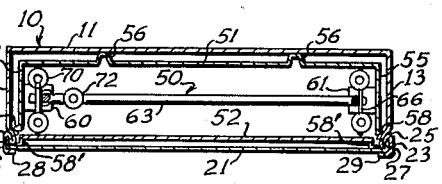
FIG. 4 is a cross sectional view taken along line 4—4 in FIG. 2, the wire heating coils and grate being deleted from the drawings.

The front panel 21 of the body 10 is a flat metal sheet having inwardly turned flanges 22 and 23 throughout its entire length. The inwardly turned flanges 22 and 23 outwardly overlap the reverse bend, inwardly deformed edge portions 24 and 25 of the outer edges of side panels 12 and 13, as seen in FIG. 4. The ends of the edge portions 24 and 25 are provided with outer plates 26 and 27 which extend around the inner edges of the flanges 22 and 23, to lie outwardly contiguous with the outer surfaces of flanges 22 and 23. The outer ends of plates 26 and 27 are provided with opposed flanges 28 and 29 which extend inwardly over the outer edges of front panel 21. It is therefore seen that the edges of the front panel 21 are joined to the outer edges of side panels 12 and 13 by the "Pittsburgh corner locks" heretofore described, the corner locks forming airtight, easily assembleable joints for body 10.

The lower ends of front panel 21 terminates slightly below the horizontal plane of baffle 20 and is provided with an outwardly turned and reversely bent flange 29 to complete an outwardly spaced perimeter for receiving the frame 17, the perimeter being defined by flange 29, side members 19 and flange 16. Preferably metal screws 30 removably secure the frame 17 to this perimeter. The purpose of the outwardly spacing of the perimeter is to provide sufficient distance so that sheet rock, wall board or plaster (not shown) may be placed over the body 10 when it is in place, without also encasing the frame 17 and louvers 18.

Centrally of the front panel 21 is a rectangular opening through which protrudes a utility box 31. A room temperature thermostat 32 is carried by box 31, the thermostat 32 being spaced outwardly of the front panel 21 so that it too may be on the outside of wall board, or the like, when the unit is installed.

At the upper end portion of front panel 21 is a circular opening 33 provided with an annular cowling 34. The opening 33 and cowling 34 are offset to one side of the center line of front panel 21. A motor 35 is mounted in opening 33 so that its central portion is surrounded by cowling 34, the motor 35 being of substantially less diameter than the diameter of cowling 34. The motor 35 is carried by its forward end by a spider 36 having three radially spaced arms 37. Bolts 38 pass through the outer ends of arms 37 and through resilient spacers or shock absorbers 39 and into the front panel 21 adjacent opening 33.

On the inner end of motor 35, which is within the body 10, the shaft of motor 35 is provided with a fan, blower or impeller blade 40 which is rotated by motor 35 wholly within the body 10. An air deflector 41 surrounds impeller 40, the deflector being formed from a rectangular sheet of metal of a thickness about equal to the width of body 10. The central portion of deflector 41 is shaped as an involute with straight downwardly projecting end portions. The air deflector 41 is provided along one edge with an inwardly turned flange 42 by means of which the deflector 41 is secured to back 11.

It is now seen that upon rotation of motor 35, the impeller 40 will urge air inwardly through opening 33 and thence the air will be directed by air deflector 41 downwardly through the tubular body 10 so as to be deflected outwardly through louvers 18 by baffle 20.

To assure that the wall board does not cover opening 33, a rectangular air intake defining frame is provided on front panel 21. This air intake defining frame is formed of end to end abutting angle irons 43 secured by, say spot welding, to front panel 21. The upper and lower angle irons 43 are horizontal and parallel to each other, the upper angle iron being spaced downwardly slightly from top 15. The vertically disposed angle irons 43 are inwardly spaced by an equal amount from the edges of front panel 41.

A solid intake grill or cover plate 44, which has inwardly bevelled edges 45, is secured over the opening 33 and motor 35, the plate 44 being spaced outwardly of front panel 21 by means of spacer bars 46 extending between plate 44 and front panel 21. The spacer bars 44 are relatively narrow elements radially spaced around motor 35 and secured to plate 44 by bolts 47. Preferably the plate 44 with its edges 45 is rectangular, being as large or larger than the air intake defining frame and being sufficiently spaced from the front panel 21 to permit free passage of air between the edges 45 and the angle irons 43. Access may be had to motor 35 by simply removing bolts 47.

Within the lower portion of body 10 immediately above the baffle 20 is the heating element denoted generally by numeral 50. The heating element is surrounded by a shield having a back section 51 and a front section 52. The back section 51 is formed of a rectangular sheet of metal bent to produce a channel member with a back plate 53 and side plates 54 and 55. As seen in FIG. 4, the back plate 53 is crimped to provide a pair of parallel U-shaped, vertically disposed protrusions 56 which are spot welded to back panel 11 immediately above baffle 20. Thus, the back plate 53 is spaced from but fixed to the back panel 11. Likewise, the side plates 54 and 55 are spaced inwardly from side panels 12 and 13 since the width of back plates 53 is less than the width of back panel 11. Diverging flanges 57 and 58 on the ends of side plates 54 and 55 are secured to side panels 11 and 12 adjacent their forward edges so as to provide additional support for the back shield section 51.

On the other hand, the front shield section 52 is secured to the front panel 21 by end flanges 58′ protruding from shield section 52, the end flanges 58′ spacing the shield section 52 inwardly parallel to the front panel 21 to provide a vertical passageway for air. The front shield 52, however, is in registry with back plate 53 so as to form a protective shield around heating element 50.

At the lower central portions of sides 54 and 55 are transversely opposed converging spring clips 60 and 61 which provide the entire support for the heating element. Each spring clip 60 or 61 is a small rectangular sheet of metal having a base portion lying flat against the inner surface of its side plates 54 and 55, and a downwardly and inwardly extending spring portion provided with a central aperture adjacent its free end.

The heating element includes a rectangular flat wire frame comprising upper and lower frame members 62 and 63 and side members 64 and 65. A plurality of straight positioning rods 66 are secured to the side member 65 while at least one rod 67 is secured to side 64. The rods 66 and 67 preferably extend perpendicularly to the plane of and from both sides of the wire frame so as to maintain the wire frame in a central position between shield 52 and back plate 53 within the shield section 51. Diverging rods 68 and 69 extend from the lower frame member 63 outwardly parallel to the lower frame member 63 so as to maintain the heating element 50 in a central position between side plates 54 and 55. The rods 68 and 69 are removably engaged in the apertures of clips 60 and 61. Therefore, so long as the clips 60 and 61 support the rods 68 and 69, the heating element 50 is in proper position.

To remove the heating element, the spring portions of clips 60 and 61 are simply depressed outwardly and the frame lowered through the lower opening over which is normally disposed the frame 17 and louvers 18.

The rods 66 and 67 are provided with insulators 70 over which is suspended a length of spiral-wound Nichrome resistance wire 71, the central portion of the wire 71 being supported by an eyelet member 72 secured to side member 64. The arrangement is such that two portions of wire 71 lead from eyelet member 72, passing around the insulators of the lower rod 66, thence back across to and around the insulators of rod 67, next across to and around the insulator 70 of the upper rod 66 and thereafter to a terminal block 73 carried by upper frame member 62.

Mounted to the back plate 53 and extending over the heating element 50 is a bimetalic high temperature shut-off thermostat 74 which prevents overheating of the heating element.

Figure 5:
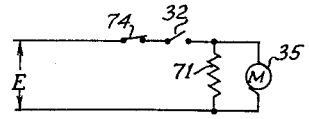
FIG. 5 is a schematic wiring diagram of the electrical circuit of the device shown in FIG. 1.

In FIG. 5, it will be seen that the switch of the high temperature cut-off thermostat 74 is in series with the switch of the room thermostat 32 and that the wire 71 and motor 35 are in parallel in the same circuit with the aforesaid switches. Therefore, with the closing of the thermostat 32, the wire 71 and motor 35 are simultaneously energized; however, if for any reason the heating element 50 becomes overheated, the switch of thermostat 74 will open to shut down the motor 35 and deenergize wire 71.

Figure 2:
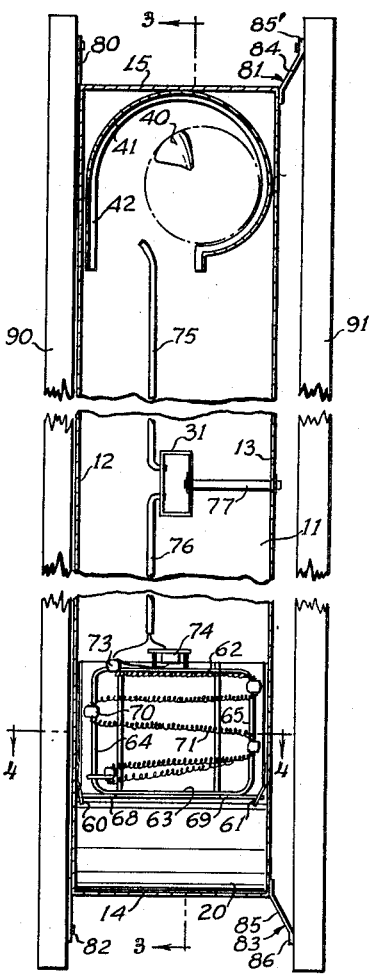
FIG. 2 is a vertical sectional view of the electrical heating and air circulating unit shown in FIG. 1, the unit being installed on adjacent studs of the wall of a building and the wire and motor being deleted from the drawings.
Figure 3:
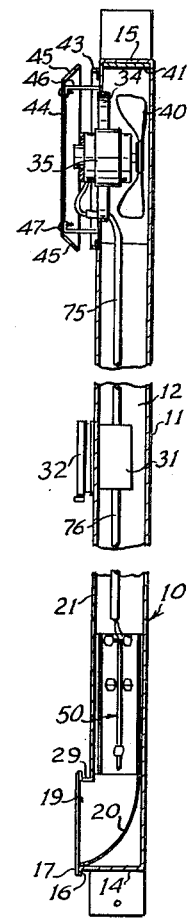
FIG. 3 is a vertical sectional view taken along line 3—3 in FIG. 2.

As best seen in FIG. 2, conduits 75 and 76, extending upwardly and downwardly from utility box 31, may be provided for conducting wires to motor 35 and the heating element 50. Also, conduit 77, passing through side panel 12 to box 31, may be employed for supplying current from a source of current (not shown) for actuating the motor 35 and energizing wire 71.

As best seen in FIGS. 1 and 2, the mounting brackets 80, 81, 82 and 83 project, beyond the body 10, upwardly and downwardly from the side panels 12 and 13. Each bracket is provided with an opening through which a screw or bolt (not shown) may pass for securing the bracket to a stud in a house. Preferably, two brackets, such as brackets 81 and 83, are bent outwardly so as to provide central portions 84 and 85 which are arranged at angles with respect to its side panel 13. The outer ends 85′ and 86 of brackets 81 and 83 are bent so as to lie parallel to side 13 but off-set therefrom.

The brackets 80 and 82 preferably lie in a single flat plane parallel to side 12 so as to permit vertical alignment of the body 10. As best seen in FIG. 2, the unit is installed by bolting brackets 80 and 82 to one upright stud 90 in a house and by bolting the other brackets 81 and 83 to the adjacent stud 91. If the unit does not fit between the studs 90 and 91, the central portions 84 and 85 are bent to adjust for the difference.

In operation, when the thermostat 32 closes its switch, this starts motor 35 and energizes wire 71 which heats up. The motor 35 drives impeller 40 which draws air through the essentially 360 degrees of space between cover plate 44 and the front panel 21 and forces this air down through tubular body 10 at a sufficient velocity to tend to cool the coils of wire 71 so that the wire 71 never reaches a red hot heat. Thus, an appreciable amount of heat is conveyed directly from the coils to the air and the heated air passes out through louvers 18 to the room, the heated air being deflected by baffle 20. When the proper temperature is reached, the switch of thermostat 32 is opened and the wire 71 is deenergized along with the deenergizing of motor 35.

From the foregoing description it is apparent that the unit heretofore described may be readiy mass produced at low cost. The deflector 41, shield section 51, heating element 50 and baffle 20 may be installed on the back panel 11 before the front panel 21 is installed. The shield section 52 may be installed on the front panel 21, prior to assembly of the body 10.

It is also apparent that ready access to the motor 35 may be had by simply removing plate 44. Indeed, the motor and impeller may be removed and replaced by simply removing spider 36. Further, no tools are required to remove or install the heating element 50 since it may be disengaged by depressing spring clips 60 and 61 and since it is of such a size that it readily passes through the bottom opening. The spring clips 60 and 61 being adjacent the bottom opening are within easy reach of a workman.

It will be obvious to those skilled in the art that many variations may be made in the embodiments chosen for the purpose of illustrating the present invention without departing from the scope thereof as defined by the appended claims.

We claim:

1. In an electric heating and air circulating unit of the type having a hollow tubular body with an opening in its upper and lower end portions, a blower in the upper opening for directing air downwardly through said tubular body and out of the opening in the lower end portion, the combination with said tubular body of horizontally aligned outwardly yieldable clips carried within said tubular body, and a heating element having outwardly protruding clip engaging elements on opposite sides thereof for removably engaging said clips, said heating element being supported by said clips in a position to be engaged by said air as it passes through said tubular body, said heating element being so dimensioned that it may be removed through said opening at the lower portion of said tubular body.

2. In an electric heating and air circulating unit of the type having a hollow tubular body with an opening in its upper and lower end portions, a blower in the upper opening for directing air downwardly through said tubular body and out of the opening in the lower end portion, the combination with said tubular body of clips with aligned openings carried within said tubular body, and a heating element including a wire frame, rods extending outwardly from opposite sides of said frame and removably engaged in said aligned openings of said clips, means above said rods for aligning said frame within said shield in spaced relationship to the inner surfaces of said tubular body, and a heating coil carried by said frame in a position to be engaged by said air as it passes through said tubular body, said heating element being so dimensioned that it may be removed through said opening at the lower portion of said tubular body.

3. In an electric heating and air circulating unit of the type having a rectangular hollow tubular body with an opening in its upper and lower end portions, a blower in the upper opening for directing air downwardly through said tubular body, and a baffle in the lower end portion for directing said air out of the opening in the lower end portion, the combination with said tubular body of a rectangular hollow shield within said body above said baffle and spaced inwardly from the sides, front and back of said tubular body, aligned inwardly protruding clips secured to opposed inner surfaces of said shield, and a heating element within said shield and removably carried by said clips, said clips being deformable outwardly to release said heating element, said heating element being so dimensioned that it may be removed through said opening at the lower portion of said tubular body without necessitating the removal of said baffle therefrom.

4. In an electric heating and air circulating unit of the type having a rectangular hollow tubular body with an opening in its upper and lower end portions, a blower in the upper opening for directing air downwardly through said tubular body, and a baffle in the lower end portion for directing said air out of the opening in the lower end portion, the combination with said tubular body of a rectangular hollow shield within said body above said baffle and spaced inwardly from the sides, front and back of said tubular body, aligned clips secured to opposed inner surfaces of said shield, and a heating element within said shield, means extending outwardly from opposite sides of said heating element and removably engaging said clips, means for aligning said heating element within said shield in spaced relationship to the inner surfaces of said shield and in a position to be engaged by said air as it passes through said tubular body, said heating element being so dimensioned that it may be removed through said opening at the lower portion of said tubular body without necessitating the removal of said baffle therefrom.

5. In an electric heating and air circulating unit of the type having a rectangular hollow tubular body with an opening in its upper and lower end portions, a blower in the upper opening for directing air downwardly through said tubular body, and a baffle in the lower end portion for directing said air out of the opening in the lower end portion, the combination with said tubular body of a rectangular hollow shield within said body above said baffle and spaced inwardly from the sides, front and back of said tubular body, aligned clips secured to opposed inner surfaces of said shield, and a heating element within said shield, said heating element including a wire frame, means extending outwardly from opposite sides of said frame and removably engaging said clips, means above said clips for aligning said frame within said shield in spaced relationship to the inner surface of said shield, and a heating coil carried by said frame in a position to be engaged by said air as it passes through said tubular body, said heating element being so dimensioned that it may be removed through said opening at the lower portion of said tubular body without necessitating the removal of said baffle therefrom.

6. An electrical heating and air circulating unit comprising an upright unitary channel member with a back panel and side panels, top and bottom plates closing the top and bottom of said channel member, a front panel carried by the outer edges of said side panels and partially closing the front of said channel member so as to define a tubular body with upper and lower openings, a blower in said upper opening, a U-shaped back shield section in said channel member above said lower opening, said U-shaped shield section having a back plate and side plates spaced inwardly from the inner surfaces of said channel member, a front shield section carried by the inner surface of said front panel, said front shield section being in registry with said back shield section to define a hollow rectangular shield, and a heating element supported within said shield, said heating element being so dimensioned as to be removable through said lower opening without necessitating the removal of said baffle.

7. An electrical heating and air circulating unit comprising an upright unitary channel member with a back panel and side panels, a front panel carried by the outer edges of said side panels and partially closing the front of said channel member so as to define a tubular body with a lower opening, there being provided an upper opening in said tubular body, the edges of said front panel and said side panels being joined by Pittsburgh corner laps, a blower in said upper opening, a grate over said lower opening, a curved baffle fixed in the lower end portion of said channel member, a U-shaped back shield section fixed in said channel member immediately above said baffle, said U-shaped shield section having a back plate and side plates spaced inwardly from the inner surfaces of said channel member, a front shield section carried by the inner surface of said front panel, said front shield section being in registry with and removable from said back shield section to define a hollow rectangular shield, and a heating element supported within said shield.

8. An electrical heating and air circulating unit comprising an upright unitary channel member with a back panel and side panels, top and bottom plates closing the top and bottom of said channel member, a front panel carried by the outer edges of said side panels and partially closing the front of said channel member so as to define a tubular body with a lower opening, there being provided an upper opening in said tubular body, a blower in said upper opening, a grate over said lower opening, a curved baffle fixed in the lower end portion of said channel member, a U-shaped back shield section fixed in said channel member above said baffle, said U-shaped shield section having a back plate and side plates spaced inwardly from the inner surfaces of said channel member, a front shield section carried by the inner surface of said front panel, said front shield section being in registry with said back shield section to define a hollow rectangular shield, a heating element removably supported within said shield, said heating element being so dimensioned as to be removable through said lower opening without necessitating the removal of said baffle, and brackets extending upwardly and downwardly from said side panels by means of which said tubular body may be secured to adjacent studs within a house, certain of said brackets having adjustable offset portions.

References Cited in the file of this patent

UNITED STATES PATENTS

| | | |
|---|---|---|
| 2,257,342 | Lintern | Sept. 30, 1941 |
| 2,471,784 | Seifner et al. | May 31, 1949 |
| 2,528,650 | Graham | Nov. 7, 1950 |
| 2,724,044 | Campbell | Nov. 15, 1955 |
| 2,852,657 | Markel et al. | Sept. 16, 1958 |